UNITED STATES PATENT OFFICE.

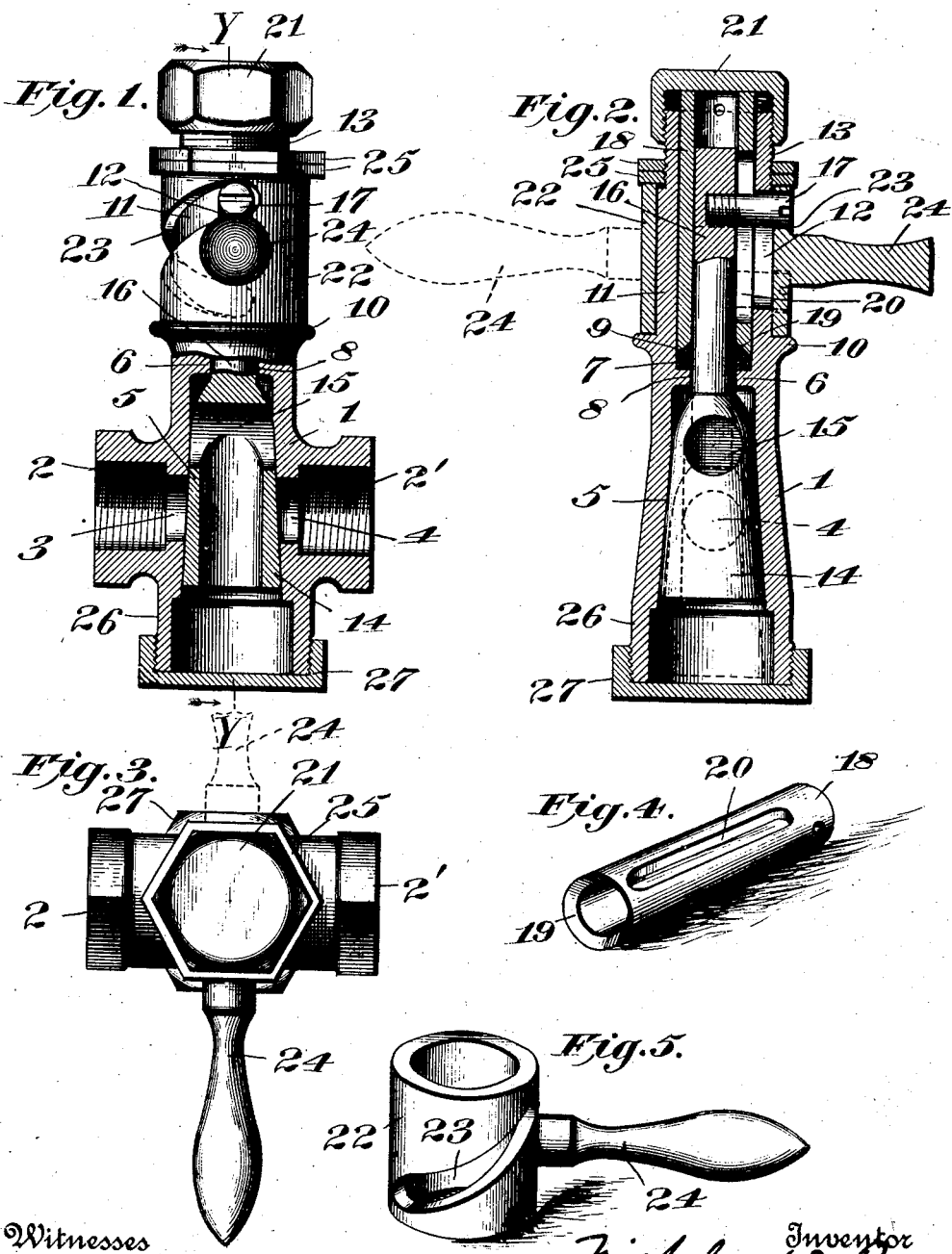

NICHOLAS W. RACE, OF WALDRON, MICHIGAN, ASSIGNOR OF ONE-HALF TO ORVILLE S. WESTERMAN, OF ADRIAN, MICHIGAN.

GATE-VALVE.

No. 839,953.  Specification of Letters Patent.  Patented Jan. 1, 1907.

Application filed February 8, 1904. Serial No. 192,721.

*To all whom it may concern:*

Be it known that I, NICHOLAS W. RACE, a citizen of the United States, residing at Waldron, county of Hillsdale, and State of Michigan, have invented certain new and useful Improvements in Gate-Valves, of which the following is a specification.

This invention relates to tapered gate-valves, and is an improvement on the gate-valves set forth in my copending application filed January 28, 1903, Serial No. 140,904.

The object of the present invention is the provision of a gate-valve which will be packed in an improved and novel manner, so that leakage will be practically obviated and the capacity to withstand very heavy pressures obtained.

Another object of the present invention is to provide a gate-valve combined with a novel form of operating means whereby the valve may be quickly and easily opened or closed.

A still further object is the provision of a tapered gate-valve adapted to be drawn into its tapered seat when closed and to be quickly and easily assembled or taken apart.

In the accomplishment of the foregoing objects, as well as others not specifically mentioned, I provide a valve embodying certain improved features and novel adaptations of elements, such as set forth fully hereinafter and recited in the appended claim.

In the accompanying drawings, Figure 1 is a front elevation with lower half broken away to show the position of the valve. Fig. 2 is a vertical section on the line $y$ $y$, Fig. 1. Fig. 3 is a top plan view. Fig. 4 is a detail view of the packing-sleeve, and Fig. 5 is a detail view of the cam-sleeve.

The valve-casing 1 has couplings 2 and 2' for connection to the sections of the pipe in which the valve is interposed, and the ports 3 and 4 connect these couplings with the tapered valve-seat 5, which is of general conical form, with its larger base in the lower part of the valve-casing. Above the valve-seat the valve-casing has an annular ledge or shoulder 6, on which is some suitable packing 7, preferably Babbitt metal, which projects inwardly to a slight degree in relation to the opening 8, formed by the flange 6, and packs the valve-stem, as will appear more fully hereinafter. This packing is also ridged upwardly, as shown at 9.

The valve-casing is provided with a circular flange 10 at the level of the packing and shoulder, and surmounting the flange is a tubular or cylindrical portion 11, having a vertical slot 12, the tube being screw-threaded at 13 above the smooth cylindrical portion thereof.

The valve 14 is of general conical form and is hollow and of such size that it is adapted to snugly fit its conical seat 5 when drawn thereinto, said valve having a port 15 transversely thereof, which is adapted to be brought into register with the ports 3 and 4 when the valve is unseated. The valve has a stem 16, which extends through the opening 8, and the packing 7 hugs said stem where said packing laps over and at the points where it is provided with its ridge 9, thus effectually packing the valve at this point. Screwed into the valve-stem is a removable screw 17, which is received in the vertical slot 12, thus guiding the valve and preventing the turning thereof on its longitudinal axis.

Surrounding the valve-stem and having a snug yet slidable fit therewith is a packing tube or sleeve 18, which has its lower end 19 concave and taking over the ridge 9 of the packing, and said tube or sleeve 18 has a slot 20 longer than but coinciding with the slot 12 and also receiving the screw 17.

A nut 21, screwed on the screw-threaded end 13, bears against the upper end of the packing-tube 18, and the packing may be thus forced more tightly against the valve-stem and the bearing of the said packing-tube 18 on the packing enhanced as found desirable.

Fitted to turn on the smooth cylindrical portion 11 is a collar 22, having a spiral cam-slot 23, which receives the screw 17 and is provided with an integral operating-handle 24, said collar being properly held on the circular flange 10 by the nuts 25 on the screw-threaded portion 13.

Below the larger base of the valve the valve-casing has an enlarged portion 26, through which the valve can be taken out, which is provided with a screw-threaded cap 27, affording access to the valve and the draining thereof when desired.

When the handle 24 is turned, the screw 17 on the valve-stem is forced up or down in the slots of the valve-casing and packing-tube by the action of the cam-slot in the collar, and the valve can be opened or closed to any desired extent very quickly and will remain where positioned even though the water-pressure is very heavy.

The peculiar manner of packing and the general improved construction of the device prevent leakage of any kind.

Having thus described my invention, what I claim as new, and desire to secure by Letters Patent, is—

In a valve, the combination with a valve-casing having a valve-seat and provided with a slot, of a valve for said valve-seat, a packing tube or sleeve surrounding the solid valve-stem and provided with a slot registering with the aforesaid slot in the casing, means for holding the packing-tube stationary, a pin secured to the solid valve-stem and extending through the slots aforesaid, and a rotary valve-operating collar on the valve-casing, said collar having a cam-slot which receives the pin aforesaid.

In testimony whereof I hereunto affix my signature in presence of two witnesses.

NICHOLAS W. RACE.

Witnesses:
 DANIEL RUMMEL,
 GEO. A. RACE.